United States Patent [19]

Croudace

[11] Patent Number: 4,995,890
[45] Date of Patent: Feb. 26, 1991

[54] STORAGE TERMINAL VAPOR EMISSION CONTROL SYSTEM

[75] Inventor: Gordon R. Croudace, Pennant Hills, Australia

[73] Assignee: Croudace Holdings Pty Ltd., New South Wales, Australia

[21] Appl. No.: 302,768

[22] Filed: Jan. 25, 1989

[30] Foreign Application Priority Data

Jan. 27, 1988 [AU] Australia ............................ PI6432

[51] Int. Cl.[5] ............................................. B01D 53/04
[52] U.S. Cl. ........................................ 55/180; 55/208; 55/270; 55/387
[58] Field of Search ................... 55/59, 62, 74, 162, 55/179, 180, 208, 387

[56] References Cited

U.S. PATENT DOCUMENTS

| | | | |
|---|---|---|---|
| 1,402,340 | 1/1922 | Burtell et al. | 55/180 |
| 1,533,716 | 4/1925 | Voress et al. | 55/180 X |
| 1,934,075 | 11/1933 | Lewis | 55/179 X |
| 2,114,810 | 4/1938 | Ray | 55/179 X |
| 2,428,885 | 10/1947 | Luáces | 55/179 X |
| 2,722,999 | 11/1955 | Bratzler et al. | 55/180 X |
| 2,747,681 | 5/1956 | Schuftan et al. | 55/180 |
| 3,972,201 | 8/1976 | Datis | 55/58 X |
| 4,203,734 | 5/1980 | Winter et al. | 55/180 X |
| 4,282,015 | 8/1981 | Bartoschek et al. | 55/179 |
| 4,414,003 | 11/1983 | Blaudszun | 55/179 X |
| 4,738,694 | 4/1988 | Godino et al. | 55/179 X |

FOREIGN PATENT DOCUMENTS

| | | |
|---|---|---|
| 1010459 | 6/1957 | Fed. Rep. of Germany . |
| 1444451 | 3/1969 | Fed. Rep. of Germany . |
| 2120183 | 11/1971 | Fed. Rep. of Germany . |
| 2518728 | 11/1976 | Fed. Rep. of Germany . |
| 2523079 | 11/1976 | Fed. Rep. of Germany . |
| 3020656 | 12/1981 | Fed. Rep. of Germany . |
| 1484534 | 9/1977 | United Kingdom ................ 55/179 |

Primary Examiner—Robert Spitzer
Attorney, Agent, or Firm—Ladas & Parry

[57] ABSTRACT

Vapor emission control system 10 for a bulk liquid chemical tank storage complex, the system includes activated carbon absorption plant 29 having a pair of absorber vessels 35 to which the vapors are delivered by a common delivery duct 40, and from which vapors are received via a common outlet duct 45, and wherein the plant 29 further includes transfer ducts which enable the vessels 35 to be connected in series or parallel.

5 Claims, 3 Drawing Sheets

LEGEND FOR DIAGRAM

PNEUMATIC ACTUATED VALVE

BLAST GATE DAMPER

PNEUMATIC DAMPER

P & V VENT AND FLOW DIVERTER

ZONE ISOLATING DAMPER

FLAME ARRESTOR

AIR HEATING / COOLING COIL

AIR FILTER

STORAGE TERMINAL VAPOR EMISSION CONTROL SYSTEM

The present invention relates to a vapour emission control system to capture and control vapours released or displaced from a variety of chemicals during their storage and handling by operators of bulk liquid chemical tank storage facilities.

More particularly, but not exclusively, the present invention relates to vapour emission control systems to control vapour emissions resulting from the storage and handling of a variety of solvents and generally odorous products.

A bulk liquid chemical tank storage complex (hereinafter referred to as a TANK FARM), usually comprises one or more storage tanks which can be used for the storage of various liquid chemicals. The complex can incorporate ship/barge loading and unloading facilities, road and rail tanker loading and unloading facilities and drum filling facilities. The liquid chemical products stored and handled at a complex can be extensive. Typically they could include: benzene, acrylonitrile, epichlorohydrin, in addition to many others. The chemical vapours requiring emission control are usually specified by the pollution control authorities and/or the tank farm operator.

The individual components incorporated in the system herein described are not necessarily new or novel. The novel features of this system relate to the combination and operation of all such components to provide the means to effectively capture and control vapour emissions.

There is disclosed herein a vapour emission control system for a tank farm, said system including collection duct means to collect vapour from said tank farm, and an activated carbon adsorption plant communicating with said duct means to receive the vapours therefrom, said plant including:
- a pair of adsorber vessels each having an inlet and an outlet and an activated carbon bed positioned between the inlet and outlet so that vapours passing through each adsorber vessel pass through the activated carbon bed thereof;
- a common delivery duct to deliver vapours to each adsorber vessel, a first branch duct extending from said common delivery duct to a first one of said vessels, a second branch duct extending from said common delivery duct to the other vessel, a first valve means to selectively close said first and second branch ducts;
- a common outlet duct extending from said vessels, a first outlet branch duct extending from the outlet of said one vessel to said common outlet duct, a second outlet branch duct extending from the outlet of said other vessel to said common outlet duct, second valve means to selectively close each of said outlet branch ducts;
- desorption piping to deliver to each vessel steam to be passed through each carbon bed to regenerate the carbon bed and convey released vapours and steam from the vessels; characterized in that said plant further includes:
- first transfer duct means connecting the outlet of the first said vessel to the inlet of the second said vessel, second transfer duct means connecting the outlet of the second said vessel to the inlet of the first said vessel, third valve means to selectively close said first and second transfer duct means; and wherein said first and second valve means are operable to connect said vessels in series or parallel.

A preferred form of the present invention will now be described by way of example with reference to the accompanying drawings, wherein.

Figure 1:
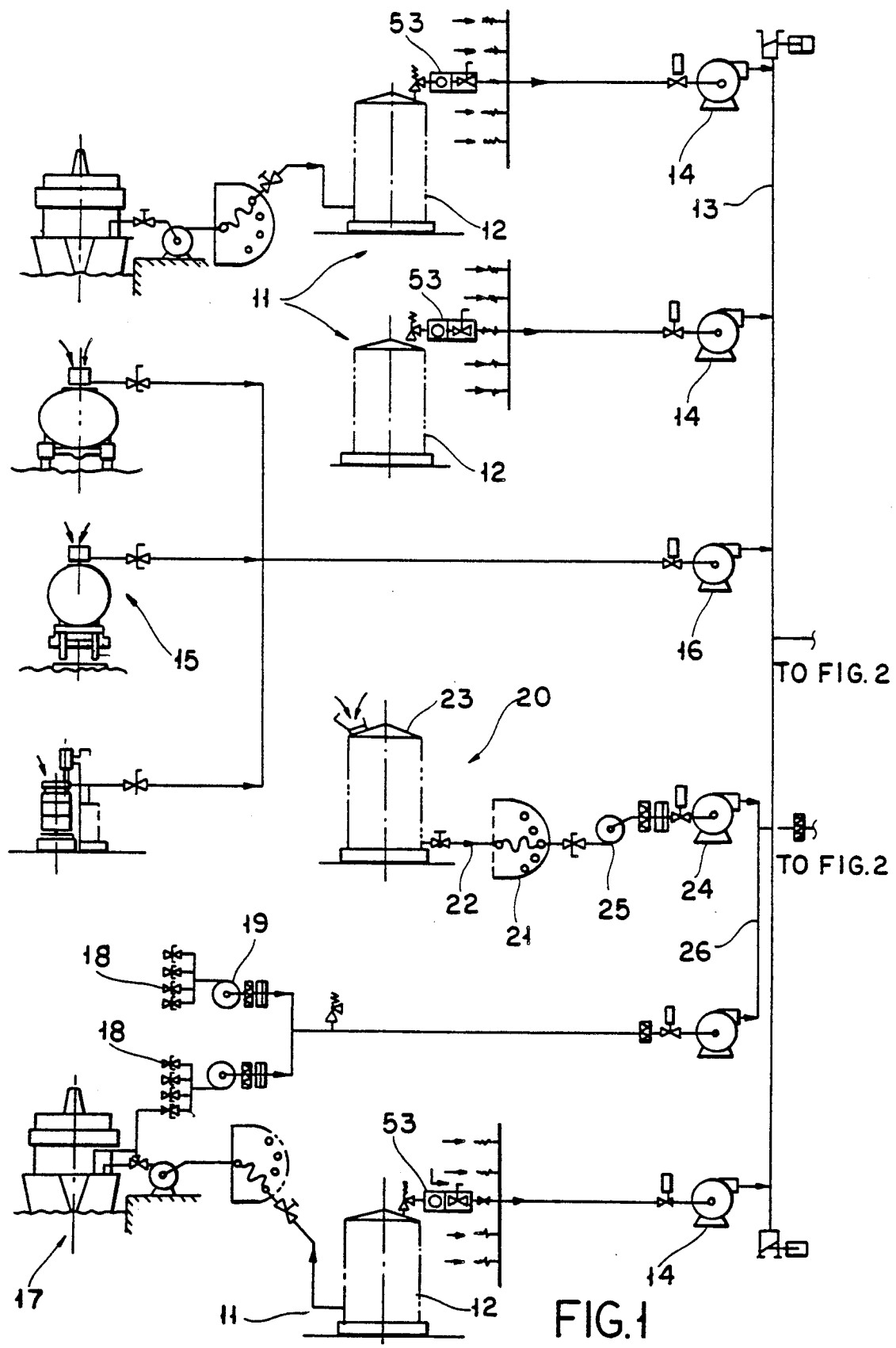
FIG. 1 is a schematic view of a portion of the vapour emission control system.
Figure 2:
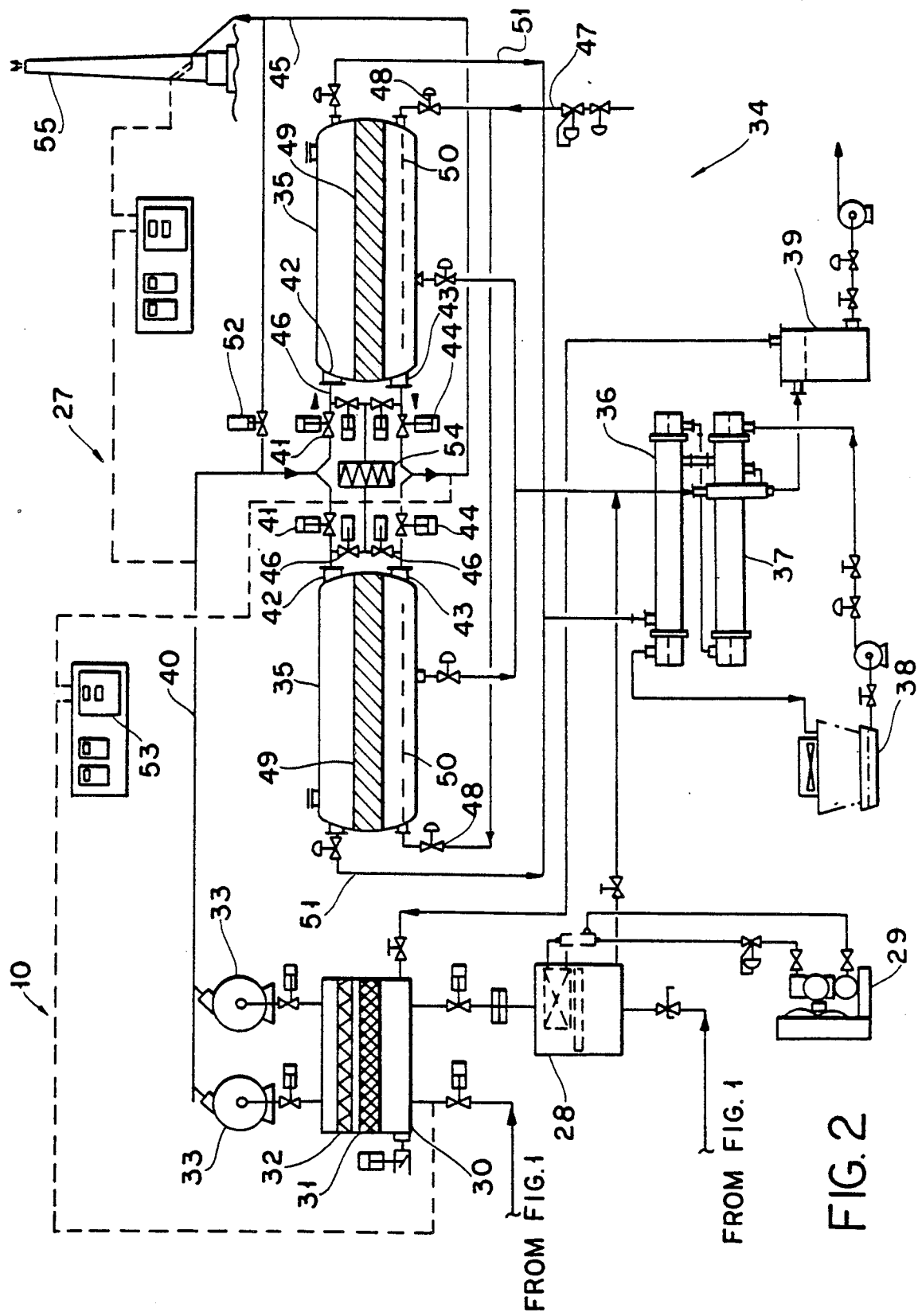
FIG. 2 is a schematic view of the adjoining portion of the vapour emission control system.
Figure 3:
FIG. 3 is a legend defining the symbols used in FIGS. 1 and 2.
Figure 3:
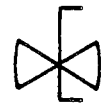
Figure 3:
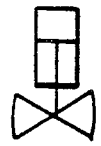
Figure 3:
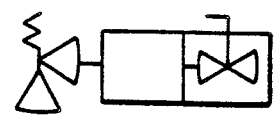
Figure 3:
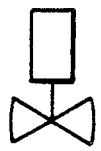
Figure 3:
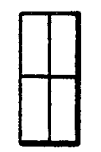
Figure 3:
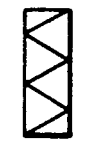
Figure 3:
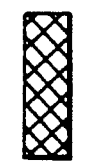

In the accompanying drawing there is schematically depicted a vapour emission control system 10 with a storage terminal vapour collection facility 11 consisting of a plurality of tanks 12. The storage tanks 12 are indirectly coupled to a common header 13. More particularly, vapours released from various pressure vents during ship-to-shore transfer operations and normal tank atmosphere breathing, are drawn continuously from the vents by centrifugal fans 14 which communicate with the common header 13.

Vapours displaced from the filling of road tankers, rail cars and drums 15 are captured at vapour collection hoods and conveyed to the common header via centrifugal fans 16.

The above arrangement ensures that the collection facility is continuously air swept, significantly diluting the displaced vapour, providing a safer approach to vapour collection. This is achieved primarily through the application of vapour vent and flow diverters 53. The diverters 53 virtually eliminate the risk of vapour reflex, and hence the possibility of contamination of stored product when employing common vapour collection heads. A suitable flow diverter is described in Australian Patent Application No. PI 4500. The use of a flow diverter also provides the facility for air to enter and purge the collection header 13, providing means for a safer approach to vapour collection.

Monitors, including Lower Explosion Level (LEL) monitors, are incorporated to continuously sense vapour concentrations within the common vapour collection header 13. This allows additional air to be delivered to the header 13 should the LEL rise to an excessive level due to some abnormal operation. During normal daily operations the vapour concentration within the air stream is not likely to exceed on average 25% LEL.

The above provides for the collection of vapours emitted from various pressure vents. At each tank a pipe way style pressure vent, termed the "primary" pressure vent, is indirectly coupled to the vapour collection system via a vapour flow diverter. The remaining pressure vent or vents, termed the "secondary" pressure vents, are permitted to vent directly to atmosphere but only during abnormal operation or circumstances.

The secondary pressure vent should be normally set close to the maximum design pressure of the tank so that it only opens if the primary vent fails to relieve the tank pressure significantly due to, for example, the secondary vent is to take care of venting in the event of the extraction fan shutting down and placing extra head on the vapour volume released.

There is further provided a ship or barge vapour collection facility 17 including a vapour collection header, i.e. blast gate damper, 18 complete with inlet manifolds permits displaced vapour to enter the collection facility at each loading point along the wharf. Flexible hoses are required to connect the collection manifold and the ship/barge vapour return line. Preferably vapours would pass through a cyclonic separator 19 to remove fine vapour mist, particularly during cooler winter months. The vapours would then be conveyed via a vapour collection header to an air cooling-vapour condensing coil, located within a plenum. The condensing coil would be coupled to a refrigeration plant. A tank cleaning/air purge vapour collection facility 20 designed to enable specific vapours to be removed from a storage tank 23 required to be cleaned. Vapour laden air is drawn from the base of the tank 23 via an interconnecting hose 22 between the purge duct 21 and the tank product line. The vapour laden air is conveyed by means of a fan 24 through a cyclonic separator 25 to remove fine vapour mist. If so required, a cooling-vapour condensing coil can be included to improve the system's capacity for high vapour load.

The facilities 17 and 20 feed the vapour to a common header 26. The common headers 13 and 26 feed vapour to a central vapour emission control plant 27. The control plant 27 includes a vapour condensing coil and air plenum 28 receiving vapour from the common header 26. The cooling coil and plenum 28 are connected to a refrigeration plant 29. Depending on the type of vapour, and its concentration, vapour will condense on the surfaces of the condensing coil, and gravity feed to a holding tank for later removal. The air stream, with a reduced vapour load, will then emerge from the condensing coil and combine with the vapour delivered from the common header 13 upon entering the common air plenum 30.

The common air plenum 30 receives a vapour laden air stream from the various sources. The plenum 30 houses air filters 31 and if necessary a heating coil or cooling coil 32. As the air stream passes through the plenum 30, the air filters remove atmospheric dust.

Airstream LEL monitoring is employed at the air plenum 30, and allows additional air to enter the plenum should the LEL rise to an unacceptable level due to some abnormal operation within the tank complex. During normal operations, the vapour concentrations within the air plenum 30 is unlikely to exceed an average 25% LEL.

Two identical single inlet single width centrifugal fans 33 are employed to draw vapour laden air from the common headers 13 and 26, and through the air plenum filter 31 and air heating/cooling coil 32. The two fans 33 then direct the vapour laden air streams through the activated carbon adsorption plant 34, and up the exhaust stack 55 to atmosphere. The activated carbon adsorption plant 34 includes two insulated steel adsorber vessels 35 each containing a horizontal bed 49 of selected activated carbon. A carbon bed overheat sensing and control system encompassing an automatic carbon bed watering quench is included within each vessel 35. In addition to all valves and controls necessary for safety, fully automatic operation, the plant incorporates the exhaust stack 55, a condensor 36, a condensate cooler 37, a cooling tower (and pump) 38 to provide the condensing and cooling medium, a condensate holding tank 39 complete with transfer pump, and a vapour breakthrough monitoring system 53 to automatically control the vessel adsorb desorb cycling modes.

The adsorption plant 34 has as its basic operation the collection and concentration of organic vapours on activated carbon. A vapour laden air stream passes through the carbon bed, for a period of time, and organic vapours contained in the stream are adsorbed (removed from the airstream) by the activated carbon. This is termed the Adsorption Cycle.

Leading from the two fans 33 is a common delivery duct 40 which delivers the vapour laden airstream to the inlets 42 of either of the vessels 35 through an inlet control valve 41. Extending from vessel outlets 43 are control valves 44 and ducting leading to a common outlet duct 45.

Interconnecting duct and airstream directional control valves 46, i.e. pneumatic dampers, permit the two vessels to be operated in series during the most part of the adsorption cycle, and to alternate as primary and secondary adsorbers. This is achieved through the controlled operation of valves 41, valves 44 and valves 46. The vapour laden airstream will first enter one vessel 35 via valve 41 and inlet 42 and then exit that vessel via outlet 43. This vessel would be termed the Primary Adsorber Vessel. The valve 44 at the primary vessel is closed to prevent the airstream from entering the common outlet duct 45.

The airstream from outlet 43 of the primary adsorber vessel is then directed by two control valves 46 to pass through a plenum, incorporating a heating coil 54, and enter inlet 42 at the other vessel 35. This vessel would be termed the Secondary Adsorber Vessel. The airstream then exits outlet 43 of the secondary adsorber vessel and passes via valve 44 to the common outlet duct 45, and to atmosphere.

The vessels 35 will alternate as primary and secondary adsorbers during the most part of any particular adsorption cycle. During the initial part of the adsorption cycle, the "primary" vessel will stand alone, and the airstream from such vessel will pass directly from its outlet 43 to duct 45 and atmosphere. This is necessary so as to allow the other vessel to be regenerated (desorbed) prior to it being placed on stream as the secondary adsorber.

After a period of time, determined by a number of variables, including carbon bed capacity and organic vapour inlet concentrations, the activated carbon within the vessels 35 undergoing an adsorption cycle reaches a point of vapour breakthrough. Through the use of a monitor for the sensing of vapour breakthrough, the adsorption cycle ceases for the particular vessel 35 concerned, upon the sensing of an unacceptable vapour level in the exiting airstream. The vapour laden airstream is then automatically diverted to the other vessel 35 so that the system can continue to adsorb vapours uninterrupted.

Immediately following a vessel 35 changeover, the vessel 35 containing the concentrated vapour enters the desorption cycle.

The desorption or regeneration cycle is performed automatically by injecting live steam into the carbon bed 49. The steam is delivered via a steam delivery line 47 which delivers the steam, via pneumatic actuated valves 48 to an outlet 50. This input of energy releases the concentrated vapour from the activated carbon. The resulting steam-hydrocarbon vapour mixture is then directed into the condensor 36 whereupon the steam and vapours are condensed. The condensate then passes through the condensate cooler 37 and then into the condensate holding tank 39 to await transfer to the "slops" storage tank. The steam-hydrocarbon vapour mixture is delivered to the condenser via delivery lines 51.

At the completion of its desorption cycle, the particular vessel 35 is immediately placed on stream as the secondary adsorber, and for a short period air heating is provided, when necessary, by coil 54 to aid in drying the activated carbon bed 49.

The present invention in its above preferred form, an average capture efficiency as high as 99% is achievable by the adsorption plant.

An emergency bypass relief valve 52 is incorporated to permit the airstream to bypass the absorber plant in the event of an emergency absorber system shutdown, or during servicing/maintenance.

The relief valve 52 is also controlled by the LEL monitor. Should the LEL level rise to unacceptable levels, and fail to reduce following the introduction of other safety features, then after a preset period of time the valve 52 will open to allow a rapid increase in air volume to purge the collection system. This action reduces the vapour concentration to a more acceptable level.

The following is a legend which provides illustrations of symbols employed in the attached drawing, to identify items which may not have been specifically mentioned in the above description.

What I claim is:

1. A combination bulk liquid chemical tank storage complex and vapour emission control system comprising:
    a plurality of vapour collection ducts;
    at least one tank connected to one of said vapour collection ducts;
    a flow diverter in said one of said vapour ducts to allow air to enter the duct but prevent vapour reflux;
    a header duct communicating with said collection ducts to receive vapour therefrom;
    fan means communicating with each collection duct to draw vapour into the collection duct from a vapour source, for delivery into said header duct;
    an air plenum connected to said header duct to receive the vapour therefrom, said plenum including heating and cooling coils to heat and cool the vapour passing through said plenum, said plenum having a plenum outlet duct;
    low explosion level monitoring means to sense vapour concentration at several locations within the complex;
    air delivery means to deliver air into said complex to selectively lower the vapour concentration within the complex in response to said low explosion level monitoring means detecting a high vapour concentration;
    a vapour emission control system to receive vapour from said complex, said system including collection duct means to collect vapour from said plenum outlet duct, and an activated carbon adsorption plant communicating with said duct means to receive the vapours therefrom, said plant including:
    a pair of adsorber vessels each having an inlet and an outlet and an activated carbon bed positioned between the inlet and outlet so that vapours passing through each adsorber vessel pass through the activated carbon bed thereof;
    a common delivery duct to deliver vapours to each adsorber vessel, a first branch duct extending from said common delivery duct to a first one of said vessels, a second branch duct extending from said common delivery duct to the other vessel, a first valve means to selectively close said first and second branch ducts;
    an outlet duct means extending from said vessels, a first outlet branch duct extending from the outlet of said one vessel to said outlet duct means, a second outlet branch duct extending from the outlet of said other vessel to said outlet duct means, second valve means to selectively close each of said outlet branch ducts;
    desorption piping to deliver to each vessel steam to be passed through each carbon bed to regenerate the carbon bed and convey released vapours and steam from the vessels; wherein said complex further includes:
    a first transfer duct means connecting the outlet of the first said vessel to the inlet of the second said vessel, a second transfer duct means connecting the outlet of the second said vessel to the inlet of the first said vessel, a third valve means to selectively close said first and second transfer duct means; and wherein said first and second valve means are operable to connect said vessels in series or parallel.

2. The storage complex and system of claim 1 wherein said first transfer duct means and said second transfer duct means include a common duct portion including a heater means to aid in drying the carbon beds.

3. The storage complex and system of claim 1, wherein each vapour collection duct is provided with a fan, with the fans constituting said fan means.

4. The storage complex and system of claim 3, further including a condensor and condensate cooler, connected to said outlet duct means so as to receive vapour therefrom.

5. The storage complex and system of claim 4, wherein a portion of the total number of said collection ducts are individually connected to a respective liquid chemical tank.

* * * * *